(12) United States Patent
Munter

(10) Patent No.: US 10,005,344 B2
(45) Date of Patent: Jun. 26, 2018

(54) APPARATUS AND METHOD FOR DISTRIBUTING A TARP OVER A CARGO ON A TRUCK LOAD BED

(71) Applicant: David R. Munter, Condon, MT (US)

(72) Inventor: David R. Munter, Condon, MT (US)

(*) Notice: Subject to any disclaimer, the term of this patent is extended or adjusted under 35 U.S.C. 154(b) by 1 day.

(21) Appl. No.: 15/386,424

(22) Filed: Dec. 21, 2016

(65) Prior Publication Data

US 2017/0096054 A1 Apr. 6, 2017

Related U.S. Application Data

(63) Continuation of application No. 14/748,096, filed on Jun. 23, 2015, now Pat. No. 9,555,696.

(51) Int. Cl.
| | | |
|---|---|---|
| *B60J 7/10* | (2006.01) | |
| *B60J 7/08* | (2006.01) | |
| *B60P 7/04* | (2006.01) | |
| *B66D 1/60* | (2006.01) | |

(52) U.S. Cl.
CPC ............... *B60J 7/085* (2013.01); *B60J 7/102* (2013.01); *B60P 7/04* (2013.01); *B66D 1/60* (2013.01); *B60Y 2400/40* (2013.01)

(58) Field of Classification Search
CPC ....... B60Y 2400/40; B60J 7/102; B60J 7/085; B66D 1/60; B60P 7/04
See application file for complete search history.

(56) References Cited

U.S. PATENT DOCUMENTS 9,555,696 B2 * 1/2017 Munter .................... B60J 7/085

* cited by examiner

*Primary Examiner* — D Glenn Dayoan
*Assistant Examiner* — Melissa A Black
(74) *Attorney, Agent, or Firm* — Glenn E. Gold, P.A.; Glenn E. Gold; David Colls

(57) ABSTRACT

A tarp distributing apparatus includes a tarp guide device held in an immobile condition adjacent to and extending upright to above a rear location on a truck load bed so as to establish the height to which a tarp can be moved to above and over the rear of a cargo on the truck load bed, a tarp draught device mounted in a mobile condition adjacent to and extending upright to above the truck load bed forwardly of the tarp guide device so as to undergo movement relative thereto and along the truck load bed for engaging and pulling the tarp relative to the tarp guide device forwardly over the cargo, and an actuation mechanism configured to manipulate and move the tarp draught device relative to the tarp guide device and the cargo so as to accomplish distributing the tarp over at least a portion of the cargo.

18 Claims, 14 Drawing Sheets

APPARATUS AND METHOD FOR DISTRIBUTING A TARP OVER A CARGO ON A TRUCK LOAD BED

CROSS-REFERENCE TO RELATED APPLICATIONS

This U.S. non-provisional patent application is a continuation of co-pending parent U.S. non-provisional patent application Ser. No. 14/748,096, filed Jun. 23, 2015, which is hereby incorporated by reference in its entirety to provide continuity of disclosure.

FIELD OF THE INVENTION

The present invention relates to covering cargo on trucks, and more particularly, is directed to an apparatus and method for distributing a tarp over a cargo on a truck load bed.

BACKGROUND OF THE INVENTION

Many trucks have load beds for carrying a load of cargo thereon. The beds are open and accessible during loading and unloading of the cargo. However, during storage and/or transport of the cargo, the load is covered either to protect it from the elements or keep loose portions thereof from escaping from the load. A cover or tarp is, therefore, typically used to cover the cargo when in storage or during transport on the truck.

Tarps are frequently heavy and loads resting on the truck load beds oftentimes have irregular configurations making it extremely difficult for truck drivers or others to manually pull heavy tarps over the loads while climbing over them. Because of such difficulty, many accidents occur each year as truck driver's fall of their trucks while trying to tarp their load. Understandably insurance companies issuing policies that cover truckers hauling such loads of cargo build in high premiums in order to discourage such hazardous activity by truckers to manually cover loads in this manner. The same can be said for companies attempting to circumvent liability by forbidding truck drivers to tarp their cargo on company property. Thus, requiring them to drive off and tarp their load somewhere else.

Accordingly, there is a need in the art for an innovation that will provide a way to prevent the aforementioned hazardous activity by truckers from arising.

SUMMARY OF THE INVENTION

The present invention is directed to an innovation that overcomes the aforementioned problems that remain unsolved by providing an apparatus and method for distributing a tarp over a cargo on a truck load bed so as to eliminate the need for the trucker to undertake manual activity directed to covering up the cargo.

In one aspect of the present invention, a tarp distributing apparatus includes:
a tarp guide device mounted in an immobile condition adjacent to and extending upright to above a rear location on a truck load bed so as to establish the height to which a tarp can be moved relative to the rear location on the truck load bed to above and over the rear of a cargo on the truck load bed;
a tarp draught device mounted in a mobile condition adjacent to and extending upright to above the truck load bed forwardly of the tarp guide device and between the rear location on the truck load bed and a front location on the truck load bed opposite from the rear location so as to undergo movement relative to the tarp guide device and along the truck load bed for engaging and pulling the tarp relative to the tarp guide device and forwardly over the cargo; and
an actuation mechanism mounted adjacent to the front location on the truck load bed and coupled with the tarp draught device, the actuation mechanism being operable to move the tarp draught device from adjacent the tarp guide device at the rear location on the truck load bed to adjacent the front location on the truck load bed relative to the tarp guide device and the cargo so as to accomplish distributing the tarp at least partially over the cargo.

In another aspect of the present invention, the tarp guide device includes an upper cross assembly establishing the height to which the tarp can be moved, relative to the rear location on the truck load bed, to above and over the rear of the cargo. The upper cross assembly includes an elongated inner bar and an outer roller extending over and rotatable about the inner bar so as to rotate as the outer roller guides the tarp to above and over the rear of the cargo.

In another aspect of the present invention, the tarp guide device also includes a pair of upright support assemblies each having a lower tubular structure and an upper tubular member supported by the lower tubular structure, the elongated inner bar of the upper cross assembly extending between and fixedly connected at opposite ends to upper end portions of the upper tubular members of the upright support assemblies. The upper end portions of the upper tubular members also extend above the upper cross assembly so as to assist in keeping the tarp from falling off the upper cross assembly as the tarp is guided above and over the rear of the cargo. Each of the upright support assemblies also has a carriage mounted to one of a pair of channels defined along each of a pair of opposite side edges of the truck load bed, each of the carriages supporting the lower tubular structure of a respective one of the upright support assemblies.

In another aspect of the present invention, the tarp draught device includes an upper cross bar having a plurality of elements attached thereon being spaced apart from one another and configured to engage with a leading end of the tarp for pulling the tarp relative to the tarp guide device and forwardly over the cargo. The tarp draught device also includes a pair of elongated posts, the upper cross bar extending between and interconnecting at opposite ends with corresponding upper ends of the elongated posts.

In another aspect of the present invention, the tarp draught device further includes a pair of carriages each being mounted to one of the pair of channels defined along the opposite side edges of the truck load bed, each of the elongated posts being pivotally mounted at a lower end to one of the carriages. Each of the carriages includes an elongated main member and a pair of wheels each mounted on a corresponding one of a pair of axles attached to one of a pair of opposite ends of the elongated main member and extending laterally therefrom. Each of the wheels are disposed in one of the channels along the opposite side edges of the truck load bed.

In another aspect of the present invention, a pair of actuators are provided each being mounted to one of the elongated main members of the carriages of the tarp draught device and drivingly coupled to the lower end of one of the elongated posts of the tarp draught device for causing the elongated posts of the draught device to undergo movement between upright positions and angularly displaced positions toward and away from the tarp guide device and the upright positions.

In another aspect of the present invention, a tarp distributing apparatus includes:

a tarp guide device mounted in an immobile condition adjacent to and extending upright to above a rear location on a truck load bed so as to establish the height to which a tarp can be moved relative to the rear location on the truck load bed to above and over the rear of a cargo on the truck load bed, the tarp guide device comprising an upper cross assembly establishing the height to which the tarp can be moved, the upper cross assembly including an elongated inner bar and an outer roller extending over and rotatable about the inner bar so as to rotate as the outer roller guides the tarp to above and over the rear of the cargo;

a tarp draught device mounted in a mobile condition adjacent to and extending upright to above the truck load bed forwardly of the tarp guide device and between the rear location on the truck load bed and a front location on the truck load bed opposite from the rear location so as to undergo movement relative to the tarp guide device and along the truck load bed, the tarp draught device comprising an upper cross bar having a plurality of elements attached thereon being spaced apart from one another and configured to engage with a leading end of the tarp for pulling the tarp, as the upper cross bar undergoes movement relative to the tarp guide device, forwardly over the cargo; and an actuation mechanism mounted adjacent to the front location on the truck load bed and coupled with the tarp draught device, the actuation mechanism being operable to move the tarp draught device from adjacent the tarp guide device at the rear location on the truck load bed to adjacent the front location on the truck load bed relative to the tarp guide device and the cargo so as to accomplish distributing the tarp at least partially over the cargo.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
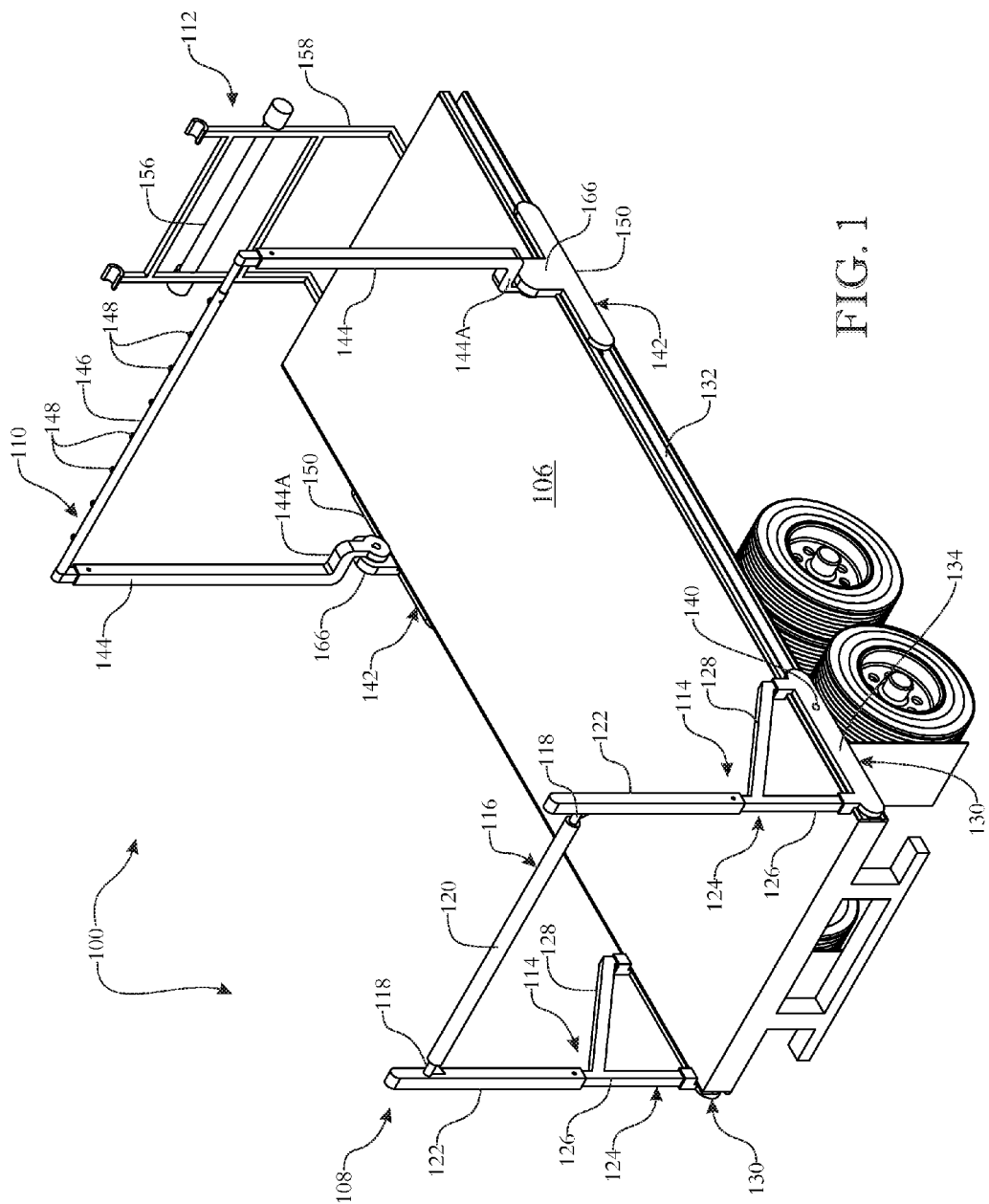
FIG. 1 presents a rear isometric view of an exemplary embodiment of a tarp distributing apparatus operatively mounted on a truck (or trailer) load bed.
Figure 2:
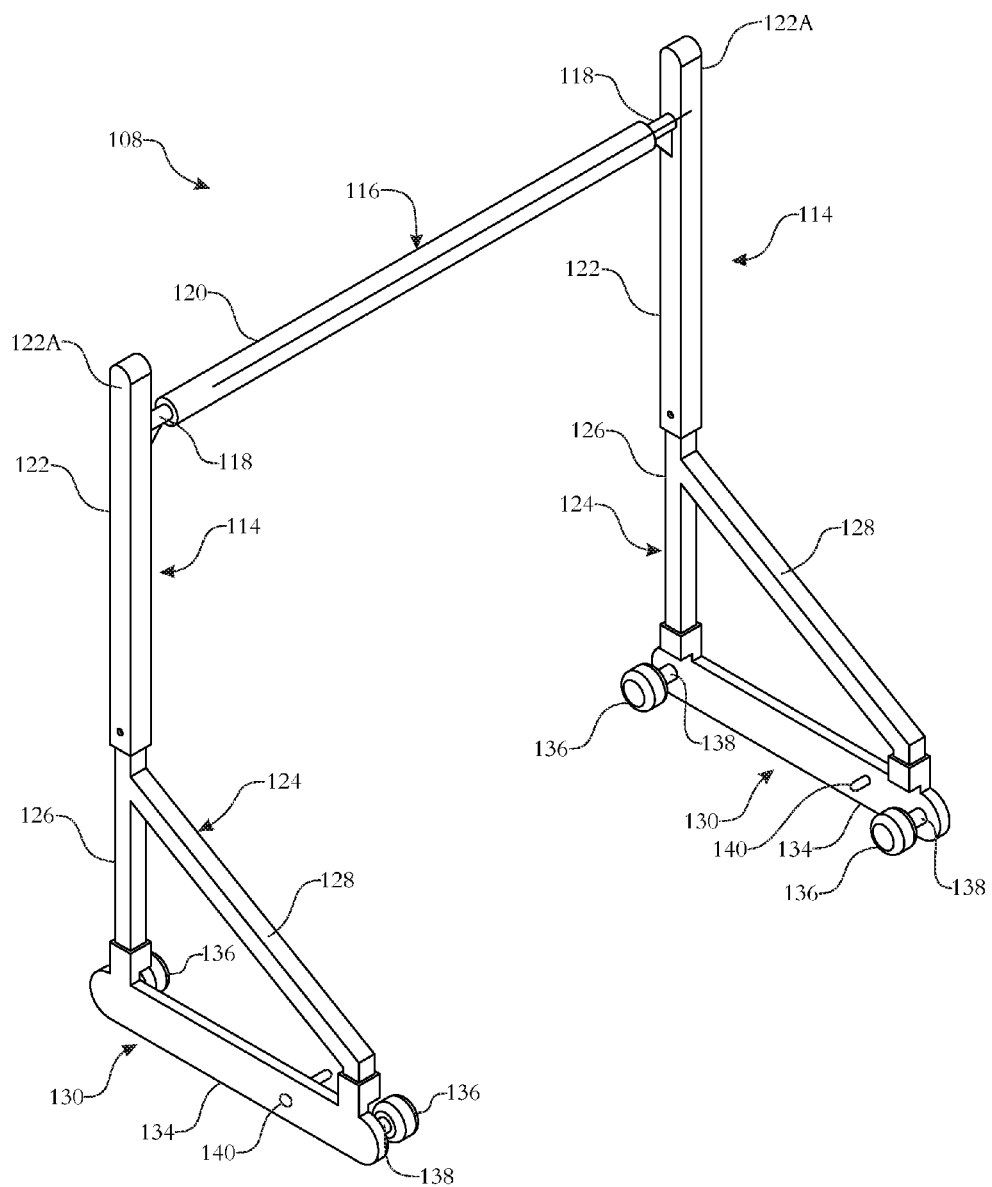
FIG. 2 presents a front isometric assembled view of a tarp guide device of the tarp distributing apparatus originally introduced in FIG. 1, the tarp guide device being mounted immobile and upright relative to a rear location on the truck load bed to establish the height to which a tarp can be moved to above and over the rear of a cargo on the truck load bed.
Figure 3:
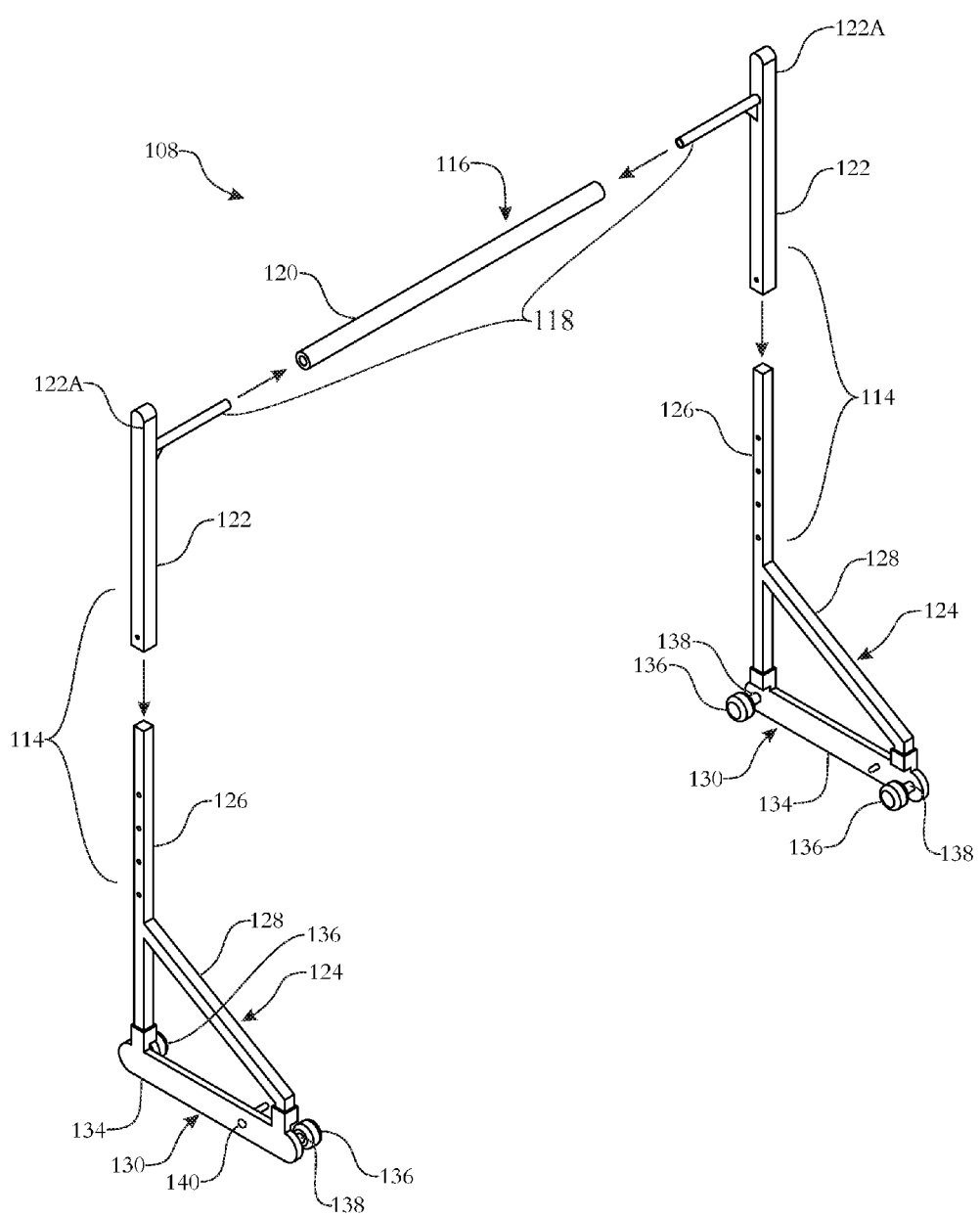
FIG. 3 presents a front isometric exploded view of the tarp guide device of the tarp distributing apparatus of FIG. 2.
Figure 4:
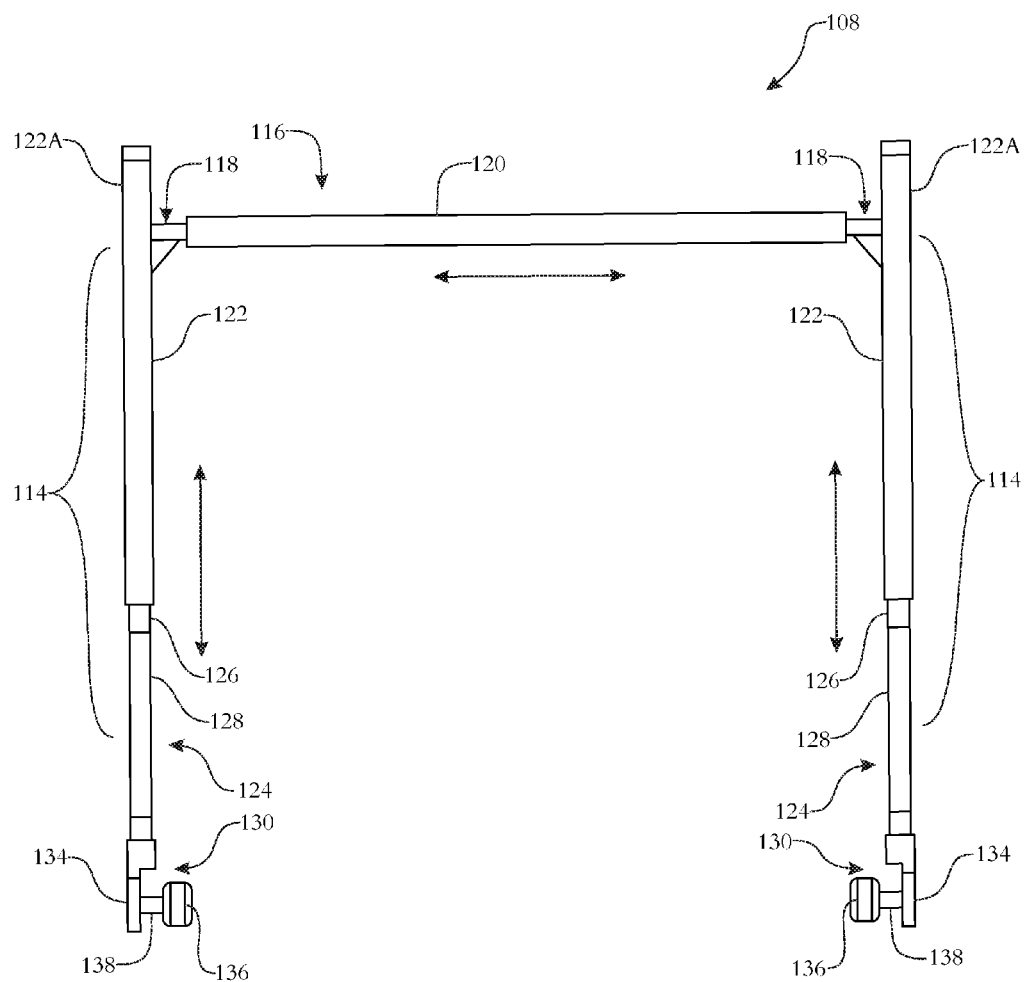
FIG. 4 presents a front assembled elevation view of the tarp guide device of the tarp distributing apparatus of FIG. 2.
Figure 5:
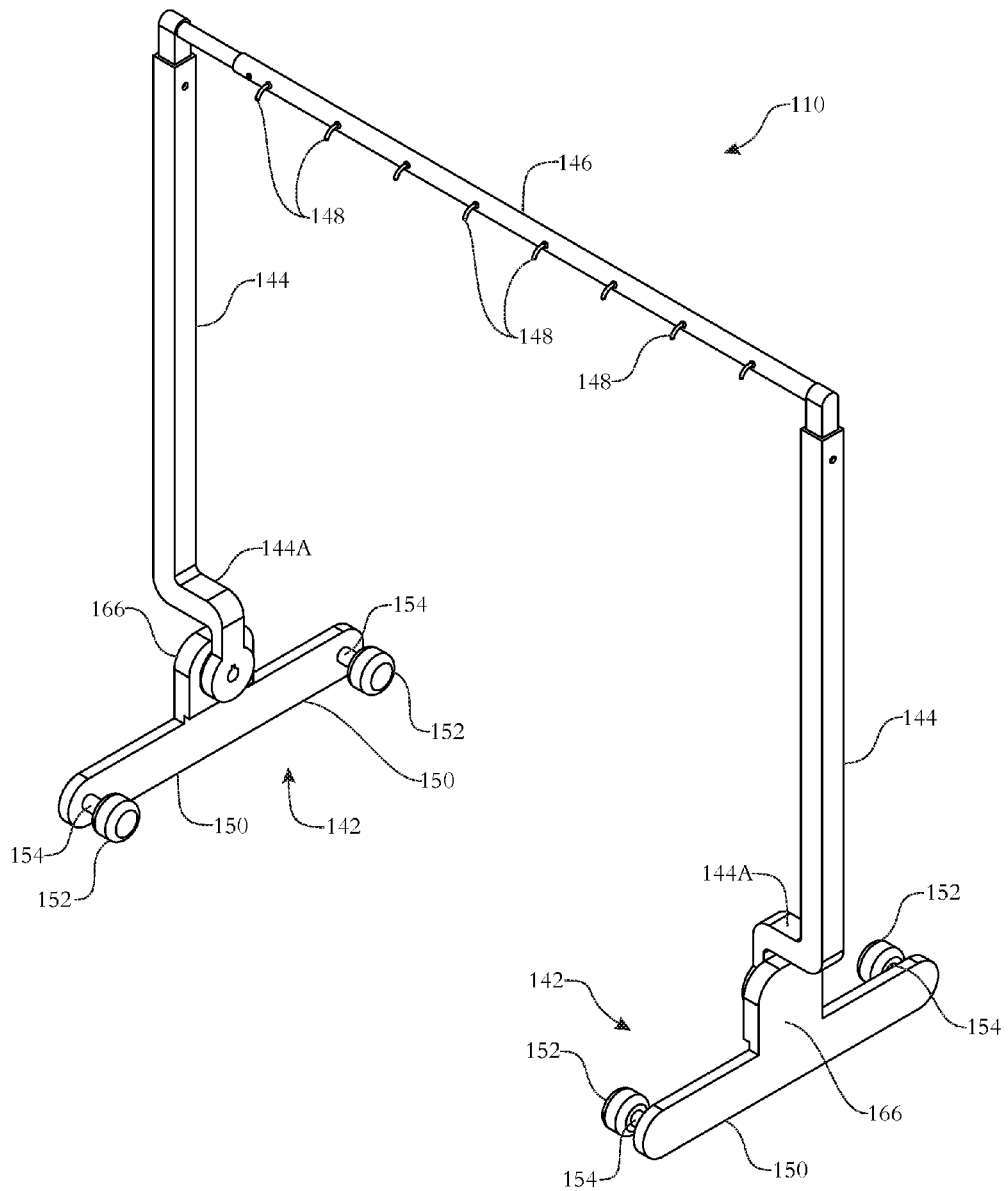
FIG. 5 presents a front isometric assembled view of a tarp draught device of the tarp distributing apparatus originally introduced in FIG. 1, the tarp draught device being mounted mobile and upright relative to the truck load bed and being actuatable so as to pull the tarp over the cargo.
Figure 6:
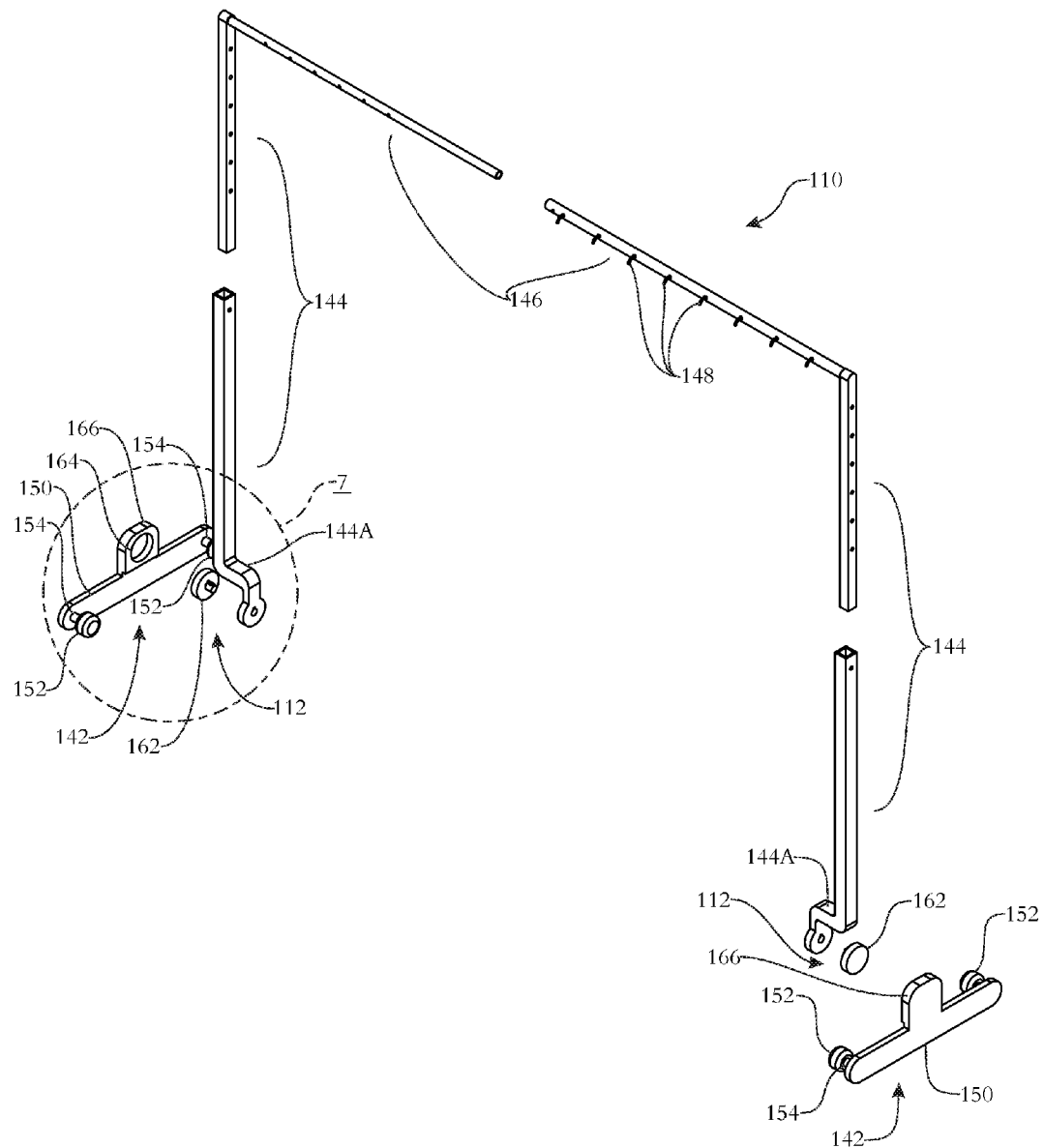
FIG. 6 presents a front isometric exploded view of the tarp draught device of the tarp distributing apparatus of FIG. 5.
Figure 7:
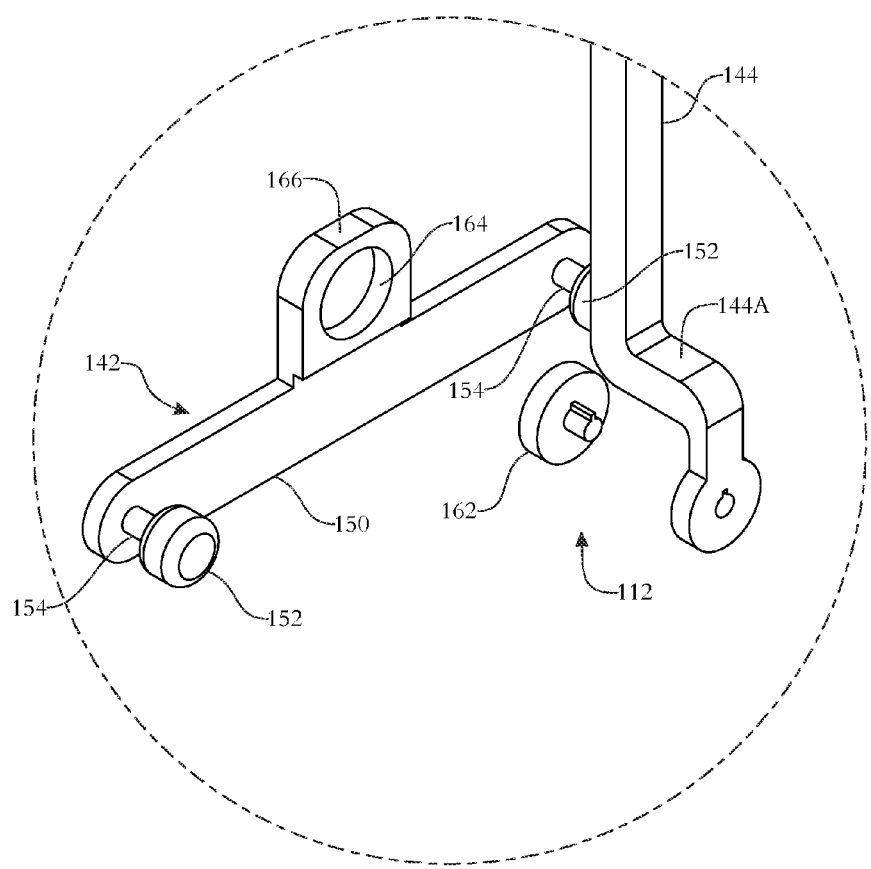
FIG. 7 presents an enlarged isometric detailed view of a lower portion of the tarp draught device that is enclosed in the dashed circle 7 of FIG. 6.
Figure 8:
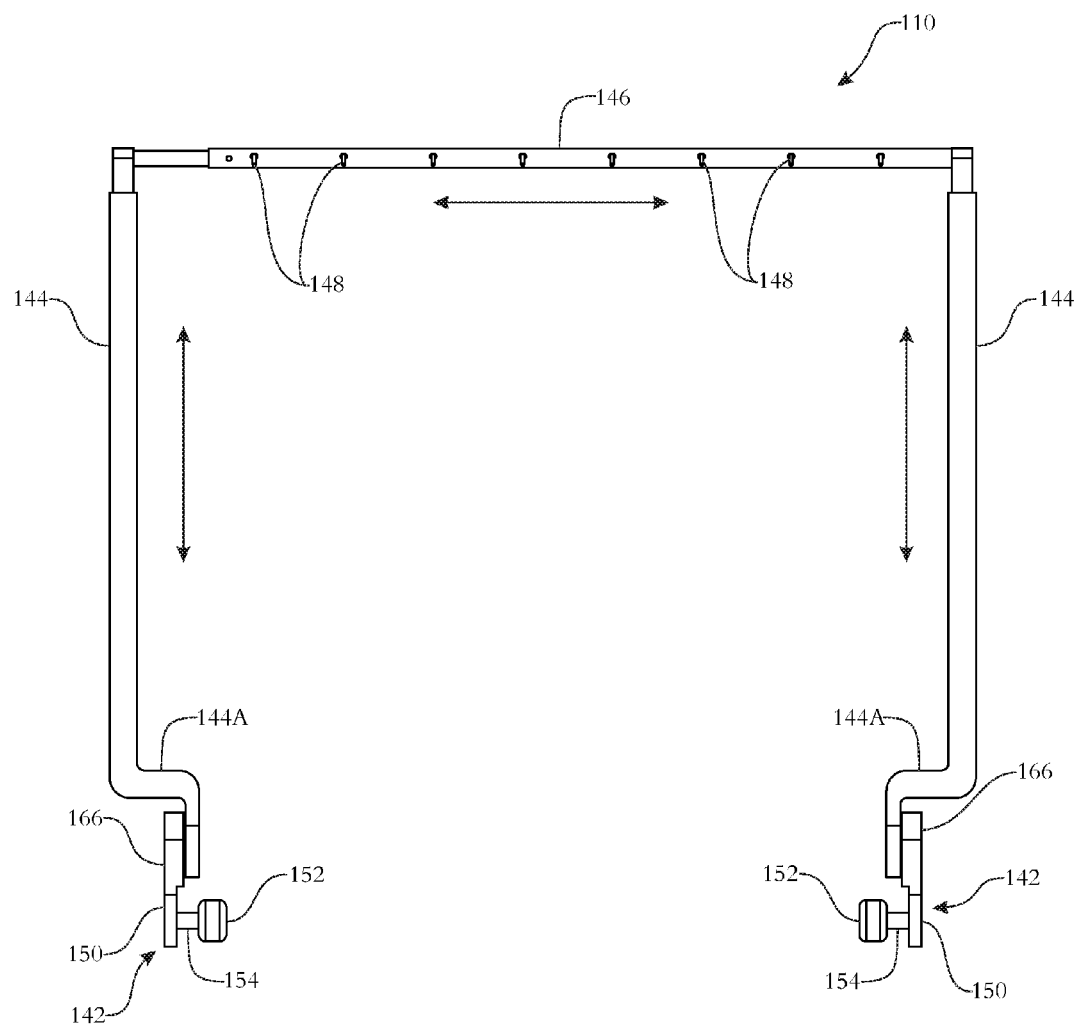
FIG. 8 presents a front assembled elevation view of the tarp draught device of the tarp distributing apparatus of FIG. 5.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-10, there is illustrated an exemplary embodiment of an apparatus, generally designated 100, for distributing a tarp 102, as seen in FIGS. 11-14, at least partially over a load of cargo 104, being shown in dashed outline form, on a mobile truck load bed 106. The tarp distributing apparatus 100 basically includes a tarp guide device 108, a tarp draught device 110, and an actuation mechanism 112. The tarp guide device 108 is disposed immobile relative to the truck load bed 106. The tarp draught device 110 is disposed mobile relative to the truck load bed 106 and actuatable to pull the tarp 102 over the tarp guide device 108 and the cargo 104. The actuation mechanism 112 is configured to manipulate and move the tarp draught device 110 relative to the tarp guide device 108 and the cargo 104 so as to accomplish distributing the tarp 102 at least partially over the cargo 104.

Referring now to FIGS. 1 and 11-14, the tarp guide device 108 is mounted in the immobile condition adjacent to and extending upright to above a rear location on the truck load bed 106 so as to establish the height to which the tarp 102 can be moved relative to the rear location on the truck load bed 106 to above and over the rear of the cargo 104 on the truck load bed 106. As additionally seen in FIGS. 2-4 and 10, the tarp guide device 108 includes a pair of upright support assemblies 114 and an upper cross assembly 116 extending between and interconnecting upper ends of the upright support assemblies 114. The upper cross assembly 116 establishes the height to which the tarp 102 can be moved relative to the rear location on the truck load bed 106 to above and over the rear of the cargo 104.

More particularly, the upper cross assembly 116 of the tarp guide device 108 includes an inner bar 118 and an outer roller 120 extending over and rotatable about the inner bar 118. The inner bar 118 extends between and is fixedly connected at opposite ends to the upper ends of the upright support assemblies 114 of the tarp guide device 108. The outer roller 120 may rotate about the inner bar 118 as the outer roller 120 guides the tarp 102 to above and over the rear of the cargo 104.

Each of the upright support assemblies 114 of the tarp guide device 108 includes an upper tubular member 122 and a lower tubular structure 124. The upper tubular members 122 of the upright support assemblies 114 have respective upper end portions 122A being fixedly connected to and extending above the respective opposite ends of the inner bar 118 of the upper cross assembly 116. The upper end portions 122A of the upper tubular members 122 of the upright support assemblies 114 of the tarp guide device 108 that extend above the upper cross assembly 116 of the tarp guide device 108 thus prevent the tarp 102, as it is being pulled and moved by the tarp draught device 110 over the upper cross assembly 116, from falling off the tarp guide device 108 and the cargo 104. The lower tubular structures 124 of the upright support assemblies 114 support the respective upper tubular members 122 by means of lower tubular members 126, which are aligned and telescopably interfitted with the respective upper tubular members 122, and by means of braces 128 extending angularly between and connected with the respective lower tubular members 126 and the respective carriages 130 of the upright support assemblies 114.

Still more particularly, each of the carriages 130 is mounted to one of a pair of tracks or channels 132 defined along opposite side edges of the truck load bed 106. Each of the lower tubular structures 124 is fixedly mounted at a lower end to one of the carriages 130. Each of the carriages 130 of the tarp guide device 108 includes an elongated main member 134 and a pair of wheels 136 each mounted on a corresponding one of a pair of axles 138 attached to one of a pair of opposite ends of the main member 134 and extending laterally therefrom, Each of the wheels 136 is disposed in the one channel 132 along the respective opposite side edges of the truck load bed 106. The immobility of the mounting of the tarp guide device 108 relative to the truck load bed 106 may be brought about by the installation of a pin 140 interconnecting the main member 134 of each of the carriages 130 with the respective side edges of the truck load bed 106.

Referring again to FIGS. 1, 11 and 12, the tarp draught device 110 is disposed adjacent to and extends upright to above the truck load bed 106 forwardly of the tarp guide device 108. As additionally seen in FIGS. 5-10, the tarp draught device 110 includes a pair of carriages 142, a pair of elongated posts 144 each pivotally mounted at a lower end to one of the carriages 142, and an upper cross bar 146 extending between and interconnecting upper ends of the elongated posts 144. The elongated posts 144 and the upper cross bar 146 may each be constructed of telescoping parts, as seen in FIGS. 6 and 8-10. The upper cross bar 146 has a plurality of elements 148, such hooks, being attached thereon and spaced apart from one another. The elements 148 are configured to engage with a leading end of the tarp 102 for pulling the tarp relative to the tarp guide device 108 and forwardly over the rear end of the cargo 104. The tarp draught device 110 is initially immobilized adjacent to the tarp guide device 108 at the start in order for its elongated posts 144 and upper cross bar 146 to undergo movement relative to its carriages 142 and the tarp guide device 108 for the elements 148 to engage the tarp 102 and pull it over to the tarp guide device 108, between the upper end portions 122A of upright support assemblies 114 thereof, and forwardly over the rear end of the cargo 104. Then, the tarp draught device 110 is mobilized so that it can undergo movement along the truck load bed 106 away from the tarp guide device 108 to continue pulling the tarp 102 over the cargo 104 toward the front end thereof.

More particularly, each of the carriages 142 includes an elongated main member 150 and a pair of wheels 152 each mounted on a corresponding one of a pair of axles 154 attached to one of a pair of opposite ends of the main member 150 and extending laterally therefrom. Each of the wheels 152 is disposed in the one channel 132 along each of the opposite side edges of the truck load bed 106. The initial immobility of the mounting of the tarp draught device 110 relative to the truck load bed 106 may be brought about by the installation of a pin 154 so as to interconnect the main member 150 of each of the carriages 142 with the respective side edges of the truck load bed 106. By removing the pin 155 the tarp draught device 110 becomes mobile relative to the truck load bed 106.

Figure 9:
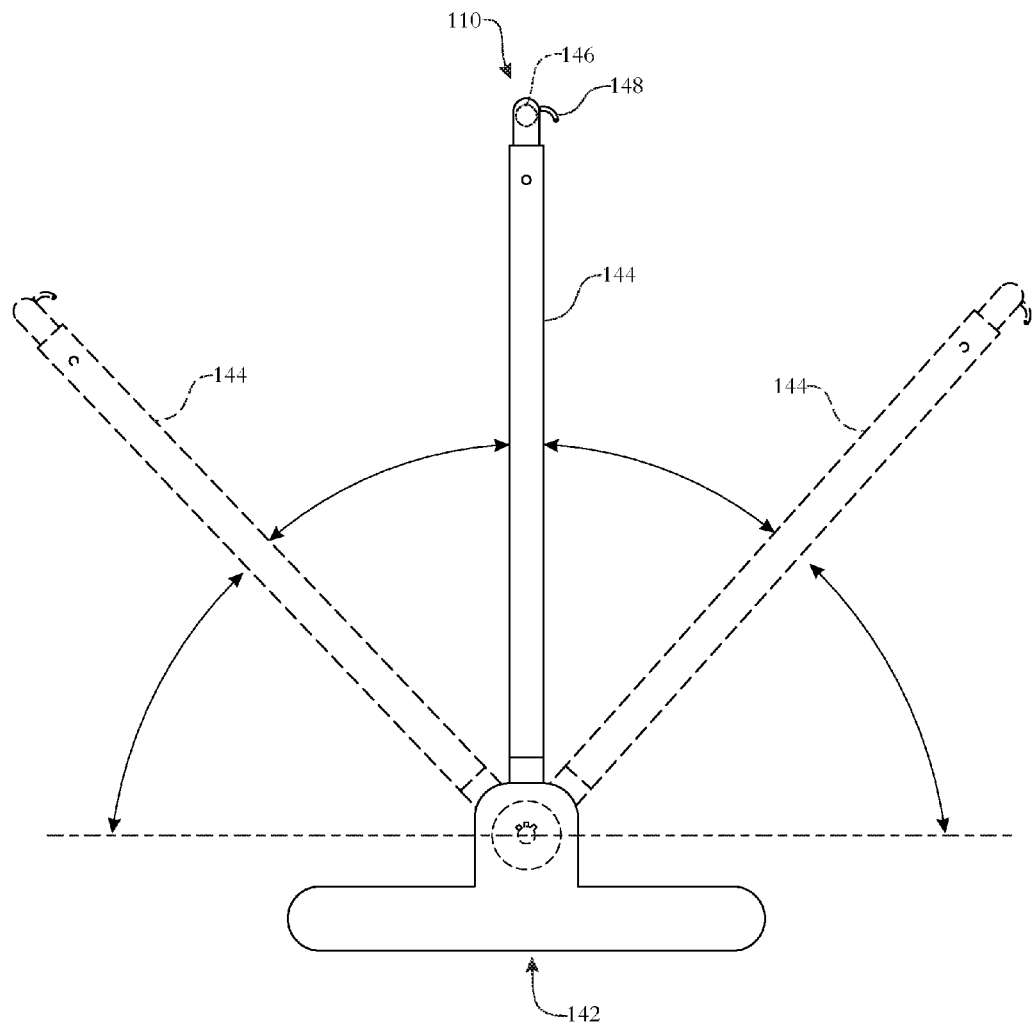
FIG. 9 presents a side elevation view of the tarp draught device of the tarp distributing apparatus of FIG. 5, showing the range of pivotal movement that a pair of elongated posts, together with an upper cross bar extending between and interconnecting upper ends of the elongated posts, of the tarp draught device can undergo relative to lower carriages of the tarp draught device.
Figure 10:
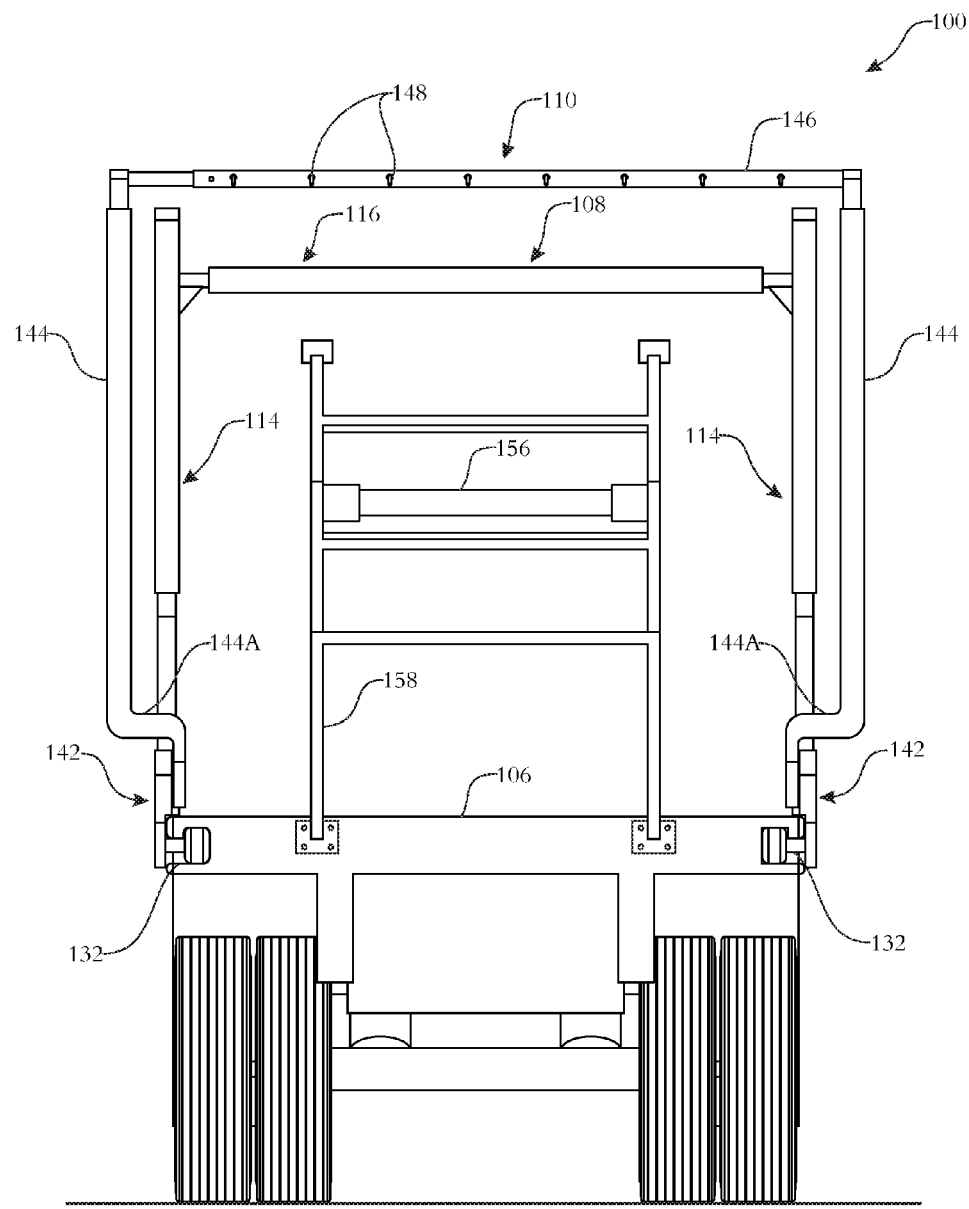
FIG. 10 presents a front elevation view of the tarp distributing apparatus originally introduced in FIG. 1.

Referring to FIGS. 1 and 10-14, the actuation mechanism 112 is configured to manipulate and move the tarp draught device 110 relative to the tarp guide device 108 and the cargo 104 so as to accomplish distributing the tarp 102 at least partially over the cargo 104. More particularly, by way of example but not limitation, the actuation mechanism 112 may be a winch 156 mounted by a bracket 158 adjacent to a front end of the truck load bed 106 and at least one cable 160 that extends between and interconnects the winch 156 with the tarp draught device 110. Alternatively, the actuation mechanism 112 may be a pair of actuators 162, such as key lock rotary motors, each being mounted within one of a pair of facing recesses 164 defined within respective housings 166 attached upon the elongated main members 150 of the carriages 142 of the tarp draught device 110 midway between the opposite ends of the main members 150. The actuators 162 pivotally and drivingly couple the lower ends of the respective elongated posts 144 of the tarp draught device 110 to the main members 150 of the carriages 142. The actuators 162 may drive the elongated posts 144 of the tarp draught device 110, or the winch 156 and cable 160 may be used to make the tarp draught device 110, to undergo movement between the upright position and the angularly displaced positions toward and away from the tarp guide device 108 and the upright position, as depicted in FIG. 9.

Figure 12:
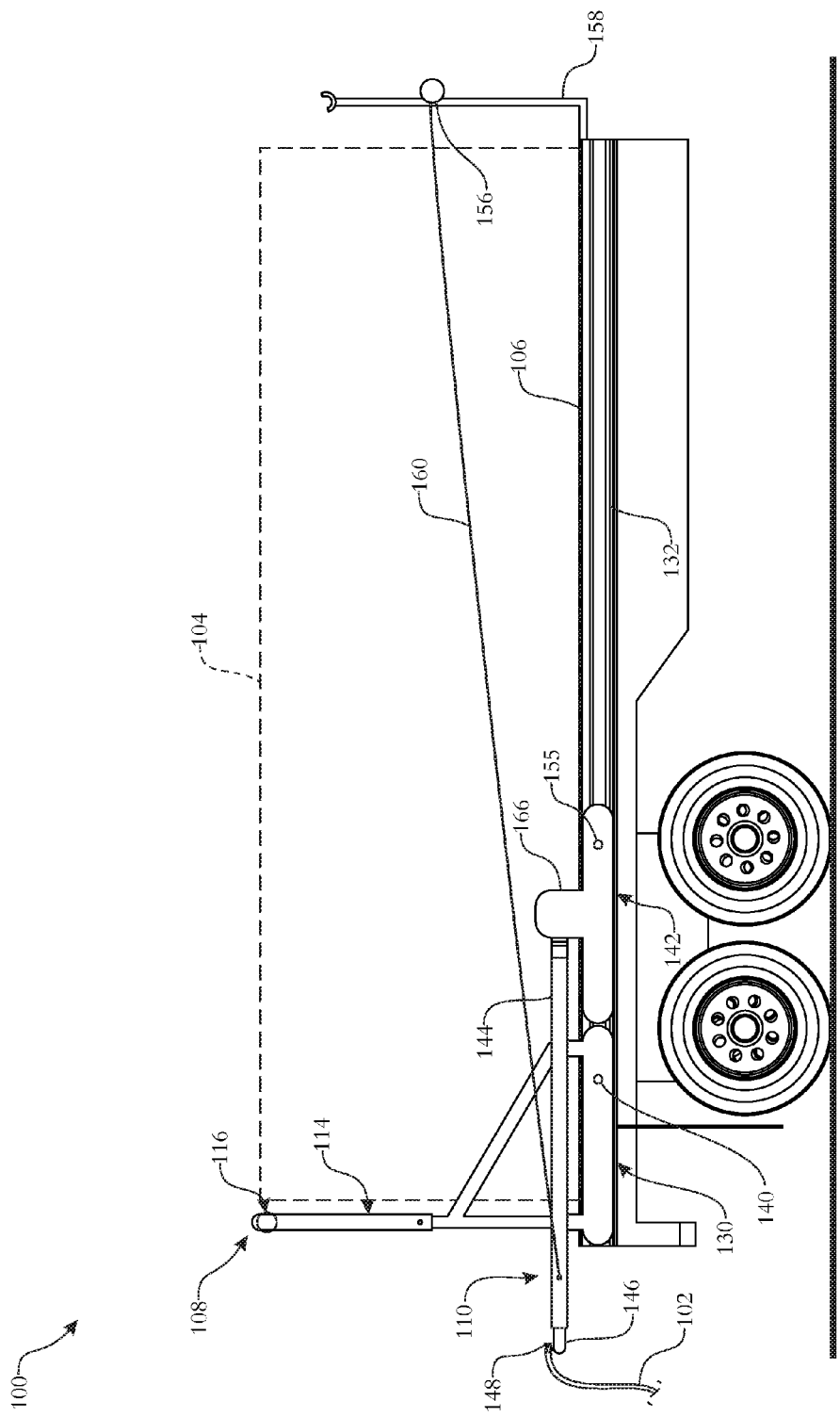

The elongated posts 144 may be spring-loaded to normally assume the upright positions. Initially, with the pin 155 installed in the tarp draught device 110, the elongated posts 144 of the tarp draught device 110 may be manually pivoted from the upright position to forwardly angularly displaced position as seen in FIG. 12. A 12V DC battery (not shown) or the like that is in the truck to provide the electrical power requirements for operation of the truck may also be the source of electrical power to operate the winch 156 or the actuators 162.

Furthermore, as seen in FIGS. 1, 5-8 and 10, the posts 144 at their lower ends have offsetting portions 144A extending away from one another so as to provide sufficient space between the posts 144 and below the upper cross bar 146 to allow the tarp draught device 110 to respectively pass by outside of and over the upright support assemblies 114 and upper cross assembly 116 of the tarp guide device 108.

Figure 11:
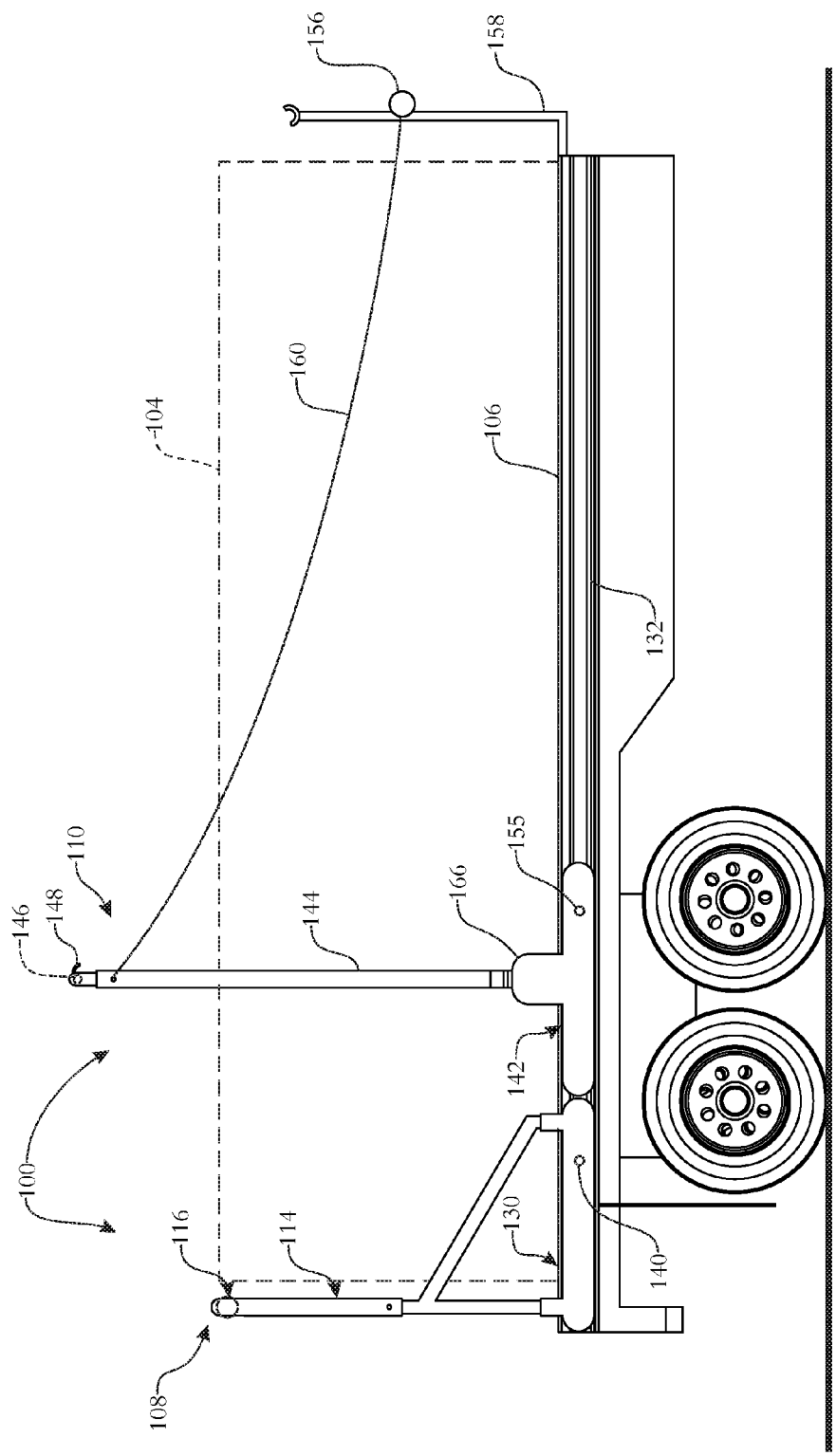
FIGS. 11-14 present multiple side elevation views of the tarp distributing apparatus in a sequence of positions during the carrying out of distributing a tarp at least partially over a load of cargo on the truck bed.
Figure 13:
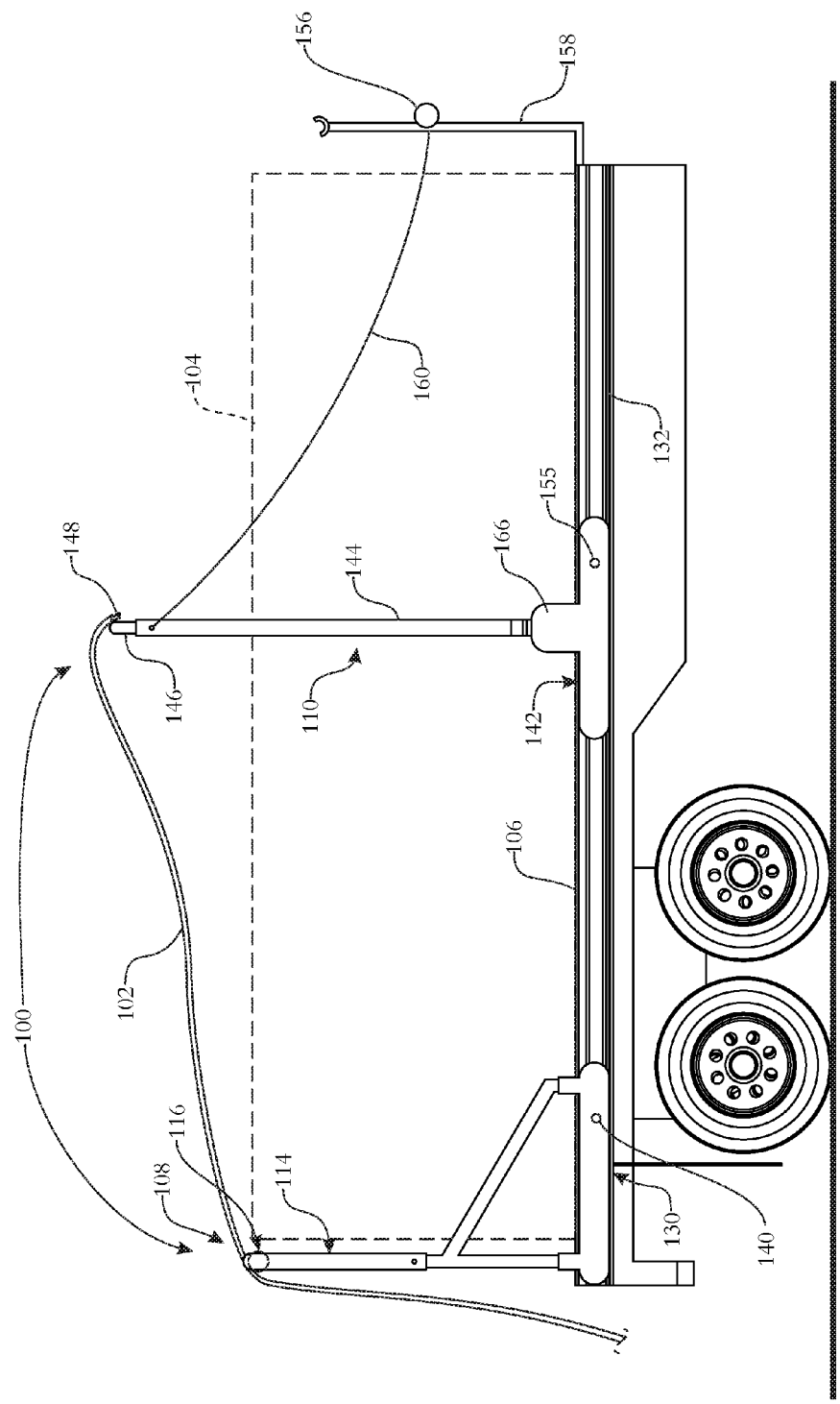
Figure 14:
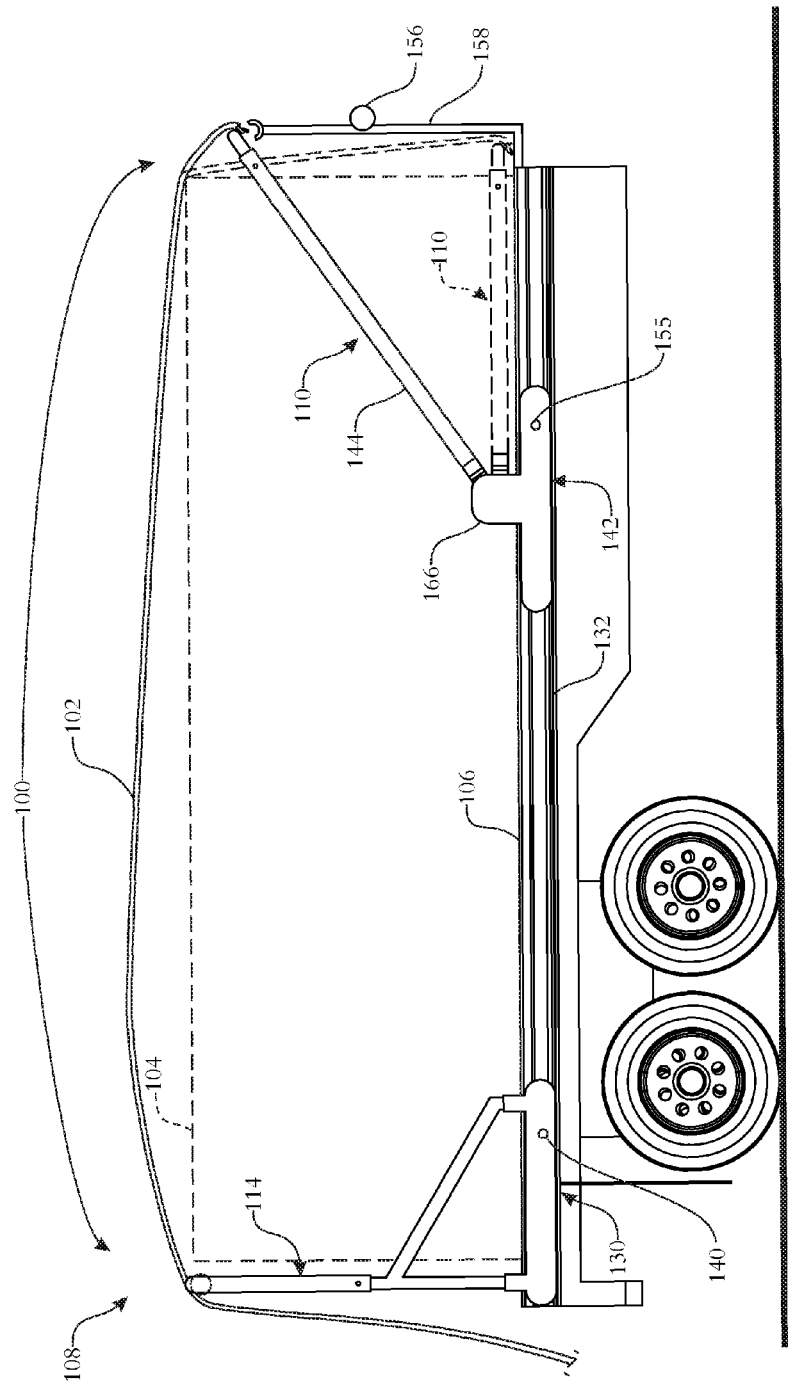

Referring now to FIGS. 11-14, there can be seen the basic steps of the method of operation of the tarp distributing apparatus 100. FIG. 11 shows positioning the upper cross assembly 116 of the tarp guide device 108 adjacent to and above the rear location on the truck load bed 106 so as to establish the height to which the tarp 102 can be moved over the outer roller 120 of the upper cross assembly 116 to above and over the rear of the cargo 104 on the truck load bed 106. Also, FIG. 11 shows positioning the upper cross bar 146 of the tarp draught device 110 forwardly of the upper cross assembly 116 of the tarp guide device 108 and above the cargo 102 on the truck load bed 106. FIG. 12 shows moving of the tarp draught device 100 relative to the upper cross assembly 116 of the tarp guide device 108 to position the upper cross bar 146 of the tarp draught device 110 along and to the rear of the cargo 104 on the truck load bed 106, followed by engaging the tarp 102 with the upper cross bar 146 of the tarp draught device 110. FIG. 13 shows moving the tarp draught device 110 and the upper cross bar 146 therewith forwardly along the truck load bed 106 and away from the upper cross assembly 116 of the tarp guide device 108 in order to pull the tarp 102 forwardly over the cargo 104 so as to accomplish distributing the tarp 102 at least partially over the cargo 104. FIG. 14 shows two alternative final positions for the tarp draught devices 110 at the end of the method of operation.

It should be understood that while only one tarp 102 is shown in use in the drawings, the operation of the apparatus 100 may be repeated to distribute more than one tarp 102 over the cargo 104. Also, after the tarp(s) 102 are distributed over the cargo 104, they are tied down to the truck load bed 106 by the driver.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:
1. A tarp distributing apparatus, comprising:
   a tarp guide device mounted adjacent to and extending upright to above a rear location on a truck load bed so as to establish the height to which a tarp can be moved relative to the rear location on the truck load bed to above and over the rear of a cargo on the truck load bed;
   a tarp draught device mounted in a mobile condition adjacent to and extending upright to above the truck load bed forwardly of said tarp guide device and between the rear location on the truck load bed and a front location on the truck load bed opposite from the rear location so as to undergo movement relative to said tarp guide device and along the truck load bed for engaging and pulling the tarp relative to said tarp guide device and forwardly over the cargo; and
   an actuation mechanism mounted adjacent to the front location on the truck load bed and coupled to the tarp draught device, said actuation mechanism being operable to move said tarp draught device from adjacent said tarp guide device at the rear location on the truck load bed to adjacent the front location on the truck load bed relative to said tarp guide device and the cargo so as to accomplish distributing the tarp at least partially over the cargo.

2. The apparatus of claim 1 wherein said tarp guide device includes an upper cross assembly establishing the height to which the tarp can be moved, relative to the rear location on the truck load bed, to above and over the rear of the cargo.

3. The apparatus of claim 2 wherein said upper cross assembly includes an elongated inner bar and an outer roller extending over and rotatable about said inner bar so as to rotate as said outer roller guides the tarp to above and over the rear of the cargo.

4. The apparatus of claim 3 wherein said tarp guide device also includes a pair of upright support assemblies each having a lower tubular structure and an upper tubular member supported by said lower tubular structure, said elongated inner bar of said upper cross assembly extending between and fixedly connected at opposite ends to upper end portions of said upper tubular members of said upright support assemblies, said upper end portions of said upper tubular members also extending above said upper cross assembly so as to assist in keeping the tarp from falling off said upper cross assembly as the tarp is guided above and over the rear of the cargo.

5. The apparatus of claim 4 wherein each of said upright support assemblies also has a carriage mounted to one of a pair of channels defined along each of a pair of opposite side edges of the truck load bed, each of said carriages supporting said lower tubular structure of a respective one of said upright support assemblies.

6. The apparatus of claim 5 wherein each of said carriages includes an elongated main member and a pair of wheels each mounted on a corresponding one of a pair of axles attached to one of a pair of opposite ends of said elongated main member and extending laterally therefrom.

7. The apparatus of claim 5 wherein said lower tubular structure of each said upright support assembly includes:
   a lower tubular member fixedly attached to and extending upwardly from one of said carriages and being aligned and telescopably interfitted with a corresponding one of said upper tubular members; and
   a brace extending angularly between and interconnecting said lower tubular member and said carriage.

8. The apparatus of claim 1 wherein said tarp draught device includes an upper cross bar having a plurality of elements attached thereon being spaced apart from one another and configured to engage with a leading end of the tarp for pulling the tarp relative to said tarp guide device and forwardly over the cargo.

9. The apparatus of claim 6 wherein said tarp draught device also includes a pair of elongated posts, said upper cross bar of said draught device extending between and interconnecting at opposite ends with corresponding upper ends of said elongated posts.

10. The apparatus of claim 7 wherein said tarp draught device further includes a pair of carriages each being mounted to one of said pair of channels defined along the opposite side edges of the truck load bed, each said elongated post of said draught device being pivotally mounted at a lower end to one of said carriages.

11. The apparatus of claim 10 wherein each of said carriages includes an elongated main member and a pair of wheels each mounted on a corresponding one of a pair of axles attached to one of a pair of opposite ends of said elongated main member and extending laterally therefrom, each of said wheels being disposed in one of the channels along the opposite side edges of the truck load bed.

12. The apparatus of claim 10 further comprising a pair of actuator each mounted to said elongated main member of one of said carriages of said tarp draught device and drivingly coupled to said lower end of one of said elongated posts of said tarp draught device for causing said elongated posts of said tarp draught device to undergo movement between upright positions and angularly displaced positions toward and away from said tarp guide device and said upright positions.

13. A tarp distributing apparatus, comprising:
 a tarp guide device mounted in an immobile condition adjacent to and extending upright to above a rear location on a truck load bed so as to establish the height to which a tarp can be moved relative to the rear location on the truck load bed to above and over the rear of a cargo on the truck load bed, said tarp guide device comprising an upper cross assembly establishing the height to which the tarp can be moved, said upper cross assembly including an elongated inner bar and an outer roller extending over and rotatable about said inner bar so as to rotate as said outer roller guides the tarp to above and over the rear of the cargo;
 a tarp draught device mounted in a mobile condition adjacent to and extending upright to above the truck load bed forwardly of said tarp guide device and between the rear location on the truck load bed and a front location on the truck load bed opposite from the rear location so as to undergo movement relative to said tarp guide device and along the truck load bed, said tarp draught device comprising an upper cross bar having a plurality of elements attached thereon being spaced apart from one another and configured to engage with a leading end of the tarp for pulling the tarp, as said upper cross bar undergoes movement relative to said tarp guide device, forwardly over the cargo; and
 an actuation mechanism mounted adjacent to the front location on the truck load bed and coupled to said tarp draught device, said actuation mechanism being operable to move said tarp draught device from adjacent said tarp guide device at the rear location on the truck load bed to adjacent the front location on the truck load bed relative to said tarp guide device and the cargo so as to accomplish distributing the tarp at least partially over the cargo.

14. The apparatus of claim 13 wherein said tarp guide device also includes a pair of upright support assemblies each having a lower tubular structure and an upper tubular member supported by said lower tubular structure, said elongated inner bar of said upper cross assembly extending between and fixedly connected at opposite ends to upper end portions of said upper tubular members of said upright support assemblies, said upper end portions of said upper tubular members also extending above said upper cross assembly so as to assist in keeping the tarp from falling off said upper cross assembly as the tarp is guided above and over the rear of the cargo.

15. The apparatus of claim 14 wherein:
 each of said upright support assemblies also has a carriage mounted to one of a pair of channels defined along each of a pair of opposite side edges of the truck load bed, each of said carriages supporting said lower tubular structure of a respective one of said upright support assemblies;
 each of said carriages including an elongated main member and a pair of wheels each mounted on a corresponding one of a pair of axles attached to one of a pair of opposite ends of said elongated main member and extending laterally therefrom; and
 said lower tubular structure of said each of said upright support assemblies including a lower tubular member fixedly attached to and extending upwardly from one of said carriages and being aligned and telescopably interfitted with said upper tubular member of a corresponding one of said upright support assemblies, and a brace extending angularly between and interconnecting said lower tubular member and said carriage.

16. The apparatus of claim 15 wherein said tarp draught device also comprises a pair of elongated posts, said upper cross bar extends between and interconnects at opposite ends with corresponding upper ends of said elongated posts.

17. The apparatus of claim 16 wherein said tarp draught device further comprises a pair of carriages each being mounted to one of said pair of channels defined along said opposite side edges of the truck load bed, each of said elongated posts being pivotally mounted at a lower end to one of said carriages, each of said carriages including an elongated main member and a pair of wheels each mounted on a corresponding one of a pair of axles attached to one of a pair of opposite ends of said elongated main member and extending laterally therefrom, each of said wheels being disposed in one of said channels along the opposite side edges of the truck load bed.

18. The apparatus of claim 17 further comprising a pair of actuators each mounted to one of said elongated main members of said carriages of said tarp draught device and drivingly coupled to said lower end of one of said elongated posts of said tarp draught device for causing said elongated posts of said tarp draught device to undergo movement between upright positions and angularly displaced positions toward and away from said tarp guide device and said upright position.

* * * * *